United States Patent Office 2,855,344
Patented Oct. 7, 1958

2,855,344

DISTILLATION PROCESS TO PRODUCE ANHYDROUS ACETONE

André Galvin, Saint-Avre-la-Chambre, France, assignor to Societe Industrielle des Derives de l'Acetylene, Paris, France, a corporation of France Application May 22, 1953, Serial No. 356,646

Claims priority, application France May 26, 1952

6 Claims. (Cl. 202—46)

The present invention has for its object the preparation of anhydrous acetone with a low consumption of thermal energy.

Another object of the invention is to utilize the reserves of sensible and latent heat contained in the gases and vapors evolving from ovens for the catalytic synthesis of acetone.

A third object of the invention is to provide a simplified method for separating the acetone from the vapors and gases with which it is mixed when evolving from the ovens, and providing a very highly anhydrous acetone.

Other objects of the invention will appear hereinafter from the following description.

It is known that the preparation of acetone from isopropanol, ethanol, acetylene, acetaldehyde or acetic acid, by de-hydrogenation, catalytic oxidation or hydration, in the vapor phase, evolves, in general, acetone vapors mixed with substances such as water vapor, unreacted vapors and gases, and non-condensable gases such as hydrogen, nitrogen, carbon dioxide and carbon monoxide. Acetone has to be extracted from this mixture. To that effect, a common practice consists in cooling the gas mixture superficially so as to condense the greater part of vapors and then in washing with water the non-condensable residual gases so as to retain the vapors carried along by said gases.

The extraction of pure acetone from the products resulting from these condensation and washings, is obtained, in general, by two successive distillations, with an intermediate treatment, in the liquid condition, by substances such as caustic sodium hydroxide or potassium permanganate.

Now these distillations are costly, due to the large consumption of heating steam (1.8 to 2.5 kg. of steam have to be used for one kilogram of acetone), necessary for obtaining an acetone with a 0.25 to 0.40% of water, since the reflux to flow ratio should then be of the order of 3.5 to 4 for columns of 40 to 50 plates operating at atmospheric pressure. In addition, successive distillations cause acetone losses and require large investments in columns, condensers and reservoirs placed before or after the distillation equipment proper. Labor and supervision costs are also large, due to the multiplicity of apparatus and their bulk. Furthermore, the fire hazards they present do not allow a grouping of catalysis and distillation in one building, under one supervision.

Methods have already been proposed, indeed, utilizing a vacuum distillation and making it possible to lower the reflux-flow ratio, to save steam and even to improve the quality of the acetone obtained. These methods, however, require large expenditures due to the arrangements required by the use of vacuum, (construction of columns and condensers capable of withstanding the relative vacuum, increasing the areas of condensers because of poor thermal exchange coefficients in vacuum, use of apparatus for maintaining the vacuum). The latter apparatus are either delicate and costly mechanical apparatus or sturdy apparatus but requiring a large consumption of steam.

Finally, these methods do not make it possible to dispense with the chemical treatments to be undergone by the acetone.

It has been proposed, also, to prepare a substantially anhydrous acetone by a fractional distillation of an acetone-water mixture under a comparatively low pressure, between 200 and 400 mm. of mercury. Such a process, however, requires preliminary operations of vapor condensation, washing of residual non-condensable gases and successive distillations, similar to the processes recalled above and with the same drawbacks.

The purpose of the present invention is to obviate these disadvantages with a simplified distillation process for the separation and dehydration of the acetone obtained from catalytic synthesis ovens in accordance with one of the above methods.

The process of this invention consists fundamentally in treating, in counter-current, the mixture of hot gases and vapors evolving from the ovens for the catalytic synthesis of acetone, after if desired, an addition of non-condensable gases, in a distillation column, by the flux of liquids moving down from top to bottom in the column, and created, on the one hand, by the reflux of pure acetone introduced at the top of the column, and, on the other, by the flux of liquids charged with acetone which may be introduced at suitably selected levels in the column, and obtained either from a washing of the non-condensable gases or from the condensation and washing of part of the mixture of gases and vapors evolving from the ovens, or again from outside installations, the heat necessary for the concentration of acetone and the exhausting of the residual liquids (water, etc.), being supplied by the sensible and latent heat in said gases and vapors, then in separating the acetone from the non condensable gases by condensing acetone vapors, these gases then being washed and the washing liquid charged with acetone being optionally brought back to the distillation column to be treated therein as described above.

According to the invention, the synthesis gases and vapors charged with acetone are, in general, directly led from the ovens to the distillation column. The latter may be single and may comprise no outside heating means.

The non condensable gases consist chiefly of nitrogen, hydrogen, carbon oxides while the vapors contain acetone, water vapor and possibly other vapors from the reaction products.

Owing to the presence of the non condensable gases, the vapors are subjected, in the column, to a partial pressure which may be substantially lower than that which would be obtained after elimination of these gases. The lowering of the partial pressure thus makes it possible to work, at the beginning of the distillation operation, at a temperature 3 to 20° C. lower. Thus the advantages inherent to distillation in a vacuum are preserved without its drawbacks. For increasing these effects and ensuring a more complete separation of a highly anhydrous acetone, non-condensable gases may also be brought in from the outside.

The presence of non-condensable gases in the distillation column constitutes a characteristic of the invention.

Another characteristic results from the utilization, for the purposes of the invention, of the sensible heat brought into the column by the gases and vapors as well as the latent heat resulting from the condensation of vapors, particularly water vapor in contact with the liquids, consisting mostly of water and acetone, moving downward, in counter-current flow relation with the upwardly moving gases and vapors. Each one of the liquids introduced in the column must be at a level corresponding to the acetone content of the liquid. Moving upwards in the column, the gases and vapors then meet purer and purer acetone, the liquid flow of which is a function of the reflux rate introduced at the upper portion of the column.

The result is a thorough dehydration of the acetone which passes back to the vapor condition and is then separated, as a pure liquid, from the non-condensable gases by condensation in suitable apparatus. The gases which escape from the condensing apparatus are then washed, with water for instance, for recuperating the acetone.

In general, the sensible and latent heat brought by the mixture into the distilling column are sufficient for obtaining a perfect concentration of the acetone under the advantageous conditions afforded by the presence of non-condensable gases. By way of example, in one case, the most unfavorable, resulting from the isopropanol-acetone catalysis utilizing the isopropanol-water azeotrope, with no addition of water vapor, an addition of 0.2 to 0.3 kilogram of steam per kilogram of pure isopropanol is sufficient to obtain a distillation without any additional expense of steam.

Furthermore, the sensible heat may or may not be sufficient for ensuring the exhausting of water and of the heavy products moving down the distillation column. If they are not, it may be advantageous to arrange, at the inlet to the column, an exhauster with a thermal addition for allowing a partial condensation of the vapors from catalysis in the heating tube assembly through which said vapors flow.

Operating in accordance with the process of the invention, a highly anhydrous acetone is obtained, with a very low water content between 0.02 and 0.10%. This result is all the more remarkable when taking into account the fact that a single column of distillation is used, operating with a normal vapour flow per unit section and using up only 0.15 to 0.5 kilogram of steam (0.550 calorie per kilogram), against 1.8 to 2.5 kilograms in common practice, per kilogram of acetone.

The production capacity of the column, however, is only 60% of what it would be if the same column were utilized in the usual manner, i. e. in the absence of non-condensable gases, due to the high reflux rate used, which is 5.5 to 7. A good grade of acetone may be obtained, however, with a 0.10 to 0.35% water content, under conditions of productivity equal to or even slightly higher than those of a column used in the usual manner and with a very low consumption of steam (less than 0.4 kg. of steam per kg. of acetone), by introducing in the column an addition of liquid charged with acetone coming either from the condensation and washing of part of the mixture of gases and vapors evolving from the ovens or from an outside condensation installation or, simultaneously from these two origins, this addition being so adjusted as to preserve the highest production capacity for the column, compatible with the obtention of the desired grade of acetone. By reflux rate is meant, herein, the ratio of the amount of liquid brought back to the top of the column to the amount which is drawn off. The efficiency of a fractional distillation column (i. e. its segregating power), is known to depend both on the number of plates and on the reflux rate.

The output of the column is limited to a maximum comprising the amount drawn off increased by the refluxed amount. Thus, if a lower amount is refluxed, more can be drawn off and the production capacity is thus increased.

This explains why, when the reflux-flow ratio is lowered, the distillation efficiency is improved and why the production capacity is affected by a high reflux rate (5.5 to 7 for a 60% efficiency).

The process in accordance with the present invention requires only a greatly simplified apparatus as compared to processes applied heretofore. Thus there is obtained a high reduction in investment costs in buildings, distillation columns, condensers and intermediate reservoirs, and the grouping of catalysis and distillation into an assembly requiring little floor space, makes it furthermore possible to decrease the maintenance costs.

Finally, the absence of a chemical treatment also constitutes a simplification which is characteristic of the invention which makes for important savings.

The following detailed description will help for a better understanding of the invention and its possible modifications with reference, by way of examples, to two schematic types of installations for applying the process.

The installation shown in Fig. 1 comprises a distillation column 1 with heat-insulated plates, to which condensation units 2 and 3 are connected, a heat exchanger 4, a washing tower 5 and other control and regulation apparatus, and circulation apparatus which will be specified hereinafter when describing the operation of the installation.

Figure 2:
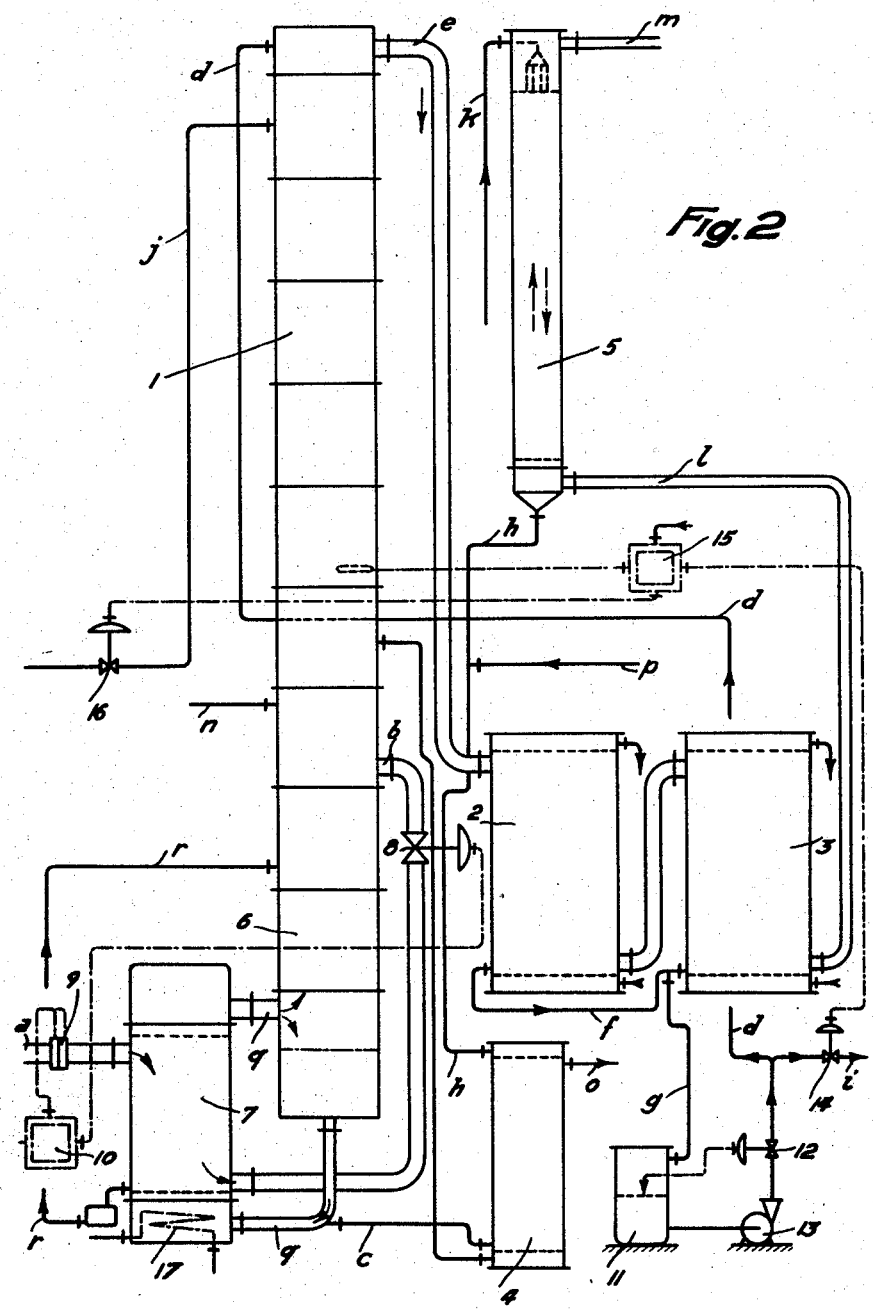
Fig. 2 is a diagram similar to that of Fig. 1, comprising a modification of the lower portion of the distillation column, making it possible to act upon and to regularize the thermal addition at the inlet of gases and vapours in the column.

The modification in Figure 2 comprises, further, an exhaustion, heat insulated column 6, arranged as a lower extension to the column 1 and a special boiler or heat exchanger 7.

Figure 1:
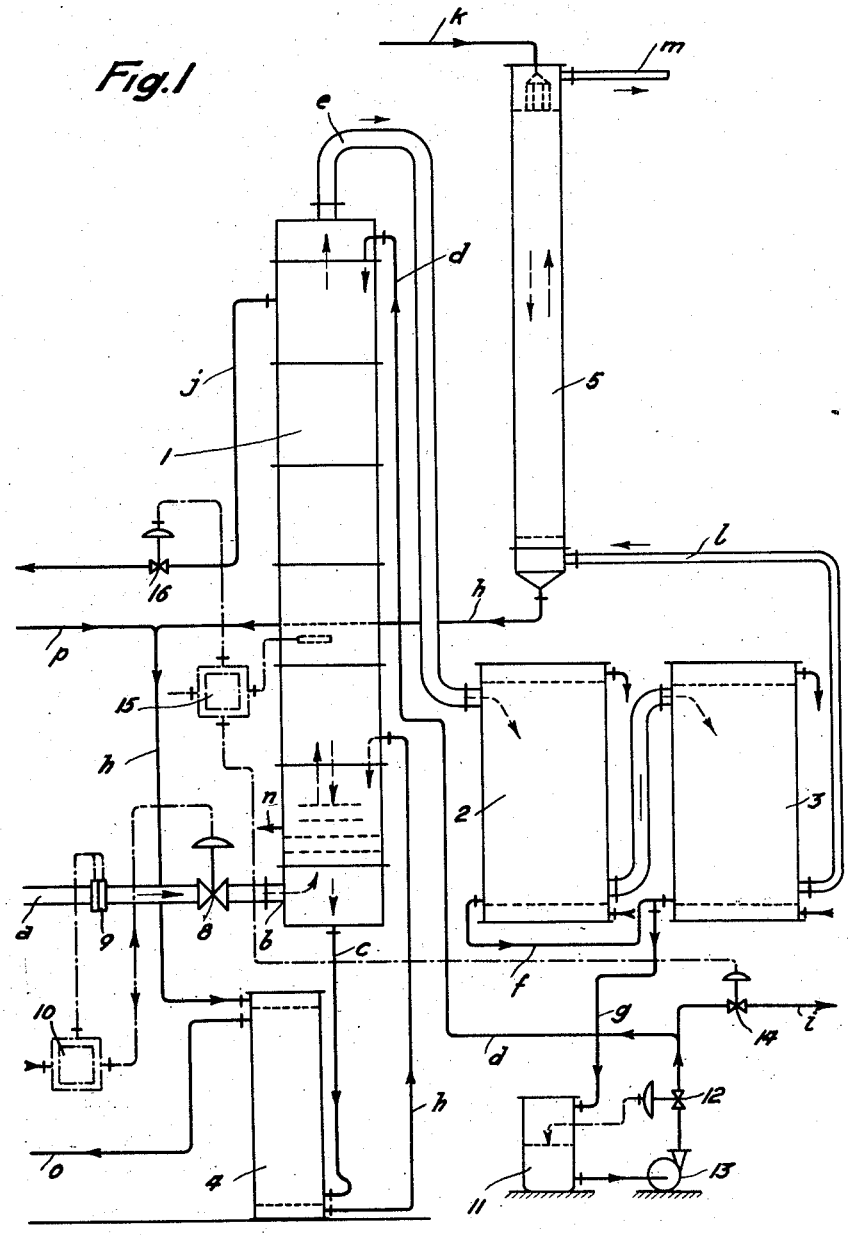
Fig. 1 is an installation diagram for applying the distillation process in accordance with the invention.

The operation of an installation according to the diagram of Figure 1 is as follows:

The non-condensable vapors and gases issuing from the catalysis ovens at a temperature of 100 to 500° C., arrive through the pipe $a$ and enter at $b$ the distillation column 1, equipped with 30 to 50 plates.

The flow of these vapors is kept constant by the automatic valve 8 controlled by the regulating elements 9 and 10. The gases and vapors rapidly cool down on the first plates, in contact with the liquids from the first phase of the treatment, moving downward. These liquids are exhausted until they contain only 5 to 30 grams of acetone per litre. When they reach the bottom of the column, they have a water content of 95 to 99% and they are evacuated through the conduit $c$ towards the exchanger 4 where they carry the heavy impurities along with them.

When moving up inside the column 1, the mixture of non-condensable gases and vapours increases in acetone concentration by the contact of the reflux of pure acetone arriving from the pipe $d$. At the top of the column, the pipe $e$ conducts a mixture of non-condensable gases and pure acetone vapors, containing 5 to 50% by volume of non-condensable gases, to the condensers 2 and 3.

These condensers condense the major part of the acetone in the mixture.

The cooling may be effected with water, in the condenser 2, and advantageously by a refrigerating fluid in the condenser 3 or simply with water in both cases.

The condensed pure acetone which collects at the bottom part of condensers is conducted by conduits $f$ and $g$ into the vat 11, held at a constant level by the automatic valve 12. A pump 13, connected to the vat 11, refluxes the acetone to the upper portion of the column 1 through the pipe $d$.

Part of the condensate of pure marketable acetone, is withdrawn from the installation through conduit $i$ to be stocked. Its flow is regulated by the valve 14 controlled by the temperature regulator 15, the circuit of which is shown in dot and dash lines. Furthermore, the acetone may advantageously be drawn off in a "pasteurized" manner through the conduit $j$ with a flow regulated by means of the valve 16. The content of dissolved gas is then 2 to 3 times less than that of the acetone condensed and withdrawn at $i$.

The non-condensable gases from condenser 3 go, through the conduit $l$, to the washing tower 5, sprayed, for instance, with water supplied through conduit $k$. Free of acetone, these gases flow out through conduit $m$ and are directed to safety washing towers. The washing liquids flow out of the tower 5 and are brought through the conduit h into the column 1, after warming in the exchanger 4 in contact with the hot liquids introduced through the conduit c. The acetone recuperated during the washings is thus recycled.

The liquids issuing, cooled, from the exchanger 4 through conduit o are united with tappings, preferably continuous, effected for instance at point n with a view to avoiding an accumulation in the column, of the impurities which cannot be eliminated through the conduit c.

The total flow of acetone issuing through conduits o and n represents, in general, only 10 to 20% of the acetone flow entering at a. The percent acetone in the mixture varies from 2 to 10%. The mixture of liquids from conduits o and n may further be fractioned into recuperated acetone, water evacuated to the sewer and raw by-products, by means of an auxiliary distillation, using from 1.5 to 2.5 kg. of steam per kg. of recuperated acetone.

A calculation shows that the total expenditure of steam per kg. of acetone obtained is only 0.15 to 0.50 kg. of steam.

When operating under such conditions that the gas mixture issuing from the catalysis ovens brings a total of 700 to 1200 kilo-calories per kilogram of acetone entering the column at b, the acetone obtained and tapped off at i has a water content of no more than 0.02 to 0.10%. These conditions are generally obtained when catalysis is effected in the presence of water vapor.

The obtained acetone is generally of a quality according to current standards, and, consequently, can be sold without any other treatment, in particular without a sodium hydroxide or permanganate treatment.

In case the total number of calories available is such that it calls for a higher reflux ratio than that necessary for obtaining the desired quality, the production capacity drops. It may be advantageous to avoid this lower capacity by previously condensing and washing a portion of the products from the ovens in a conventional installation and by introducing the liquids obtained through the conduit p with the washing liquids from the tower 5. Liquids containing acetone, provided by sources which are exterior to the installation may also be introduced. The water content of the acetone thus obtained increases when the reflux ratio decreases. For a normal production capacity, the water content remains lower than the values obtained by a conventional distillation effected in the absence of non-condensable gases.

The modified embodiment shown in the diagram of Figure 2 comprises a network of ducts and conduits having the same functions as in the diagram of Figure 1. The apparatus and elements which are to be found in both diagrams are designated by the same reference numerals and letters.

The apparatus described above, from Figure 1, is completed here by the heat insulated exhaustion column 6. It is heated, at its base, by means of a boiler bundle 7 through which passes the mixture of non-condensable gases and vapors coming from the catalysis through conduit a. The valve 8 is placed after the boiler so as to leave the latter under the highest possible pressure, which promotes the exchange and possibly a partial condensation of the vapors.

If the sensible heat of the catalysis mixture is insufficient for ensuring the exhaustion of acetone from the liquid arriving at the bottom of the column 6, additional heat may be introduced in the lower portion of the column either by an auxiliary heating device 17 or by a partial condensation of the vapors from catalysis in an exchanger in contact with said liquid. This condensation may be ensured by effecting the catalysis under 2 to 3 kg./cm.$^2$ effective pressure.

This latter solution allows a partial condensation of the vapors in the mixture in the boiler 7, a condensation which supplies the necessary heat. The condensed liquids are then brought back for exhaustion through the circuit r. Part of the liquids collected at the cottom of column 6 circulate between the boiler 7 and column 6 through pipes q.

What I claim is:

1. A continuous method of preparing pure anhydrous acetone which comprises introducing into a single multiple-plate distillation column a crude hot mixture coming directly from a reactor used for the catalytic synthesis of acetone, said mixture being composed of condensable vapors including acetone and non-condensable gases; adding an additional quantity of non-condensable gases to the mixture in the distillation column; then passing said mixture and additional gases upward in the column countercurrent to a flow of residual liquid having a low acetone content; then passing the resulting mixture and additional gases upward in the column countercurrent to a reflux flow of pure anhydrous acetone introduced near the top of the column; removing from the top of the column a second mixture consisting substantially entirely of vaporous pure anhydrous acetone and non-condensable gases; and then directly condensing and removing acetone of commercial purity from said second mixture.

2. A method described in claim 1 in which the non-condensable gases separated by said condensation are washed to remove any remaining acetone; the resulting washing liquid being recycled to the distillation column as said residual liquid.

3. A method described in claim 1 wherein the acetone is distilled from the top of the column by utilizing the sensible heat of said condensable vapors and non-condensable gases and the latent heat of said vapors.

4. A method of preparing anhydrous acetone, which comprises introducing into a distillation column adjacent the bottom thereof, the condensable vapors including acetone and water and the non-condensable gases resulting from the catalytic synthesis of acetone, introducing pure liquid acetone into the distillation column adjacent the top thereof, flowing the liquid acetone countercurrent to said vapors and gases to condense water vapor and acetone vapor to produce a water-acetone liquid, distilling acetone from the water-acetone liquid in the presence of said non-condensable gases by utilizing the sensible heat of said vapors and gases and a latent heat of said vapors, withdrawing only anhydrous acetone vapors and non-condensable gases from the top of the column and directly condensing the acetone vapors from the non-condensable gases, and introducing into the column at a level below the level at which the pure liquid acetone is introduced, a liquid containing a lower concentration of acetone than the pure liquid acetone.

5. A method described in claim 4 wherein the method is performed at atmospheric pressure.

6. A method described in claim 4 wherein said liquid acetone and said liquid containing a lower concentration of acetone flow downwardly over a plurality of fractionating plates in the distillation column.

References Cited in the file of this patent

UNITED STATES PATENTS

| Number | Name | Date |
|---|---|---|
| 648,389 | Chute | May 1, 1900 |
| 1,833,717 | Laird | Nov. 24, 1931 |
| 1,876,594 | Becker | Sept. 13, 1932 |
| 2,047,611 | Baxter | July 14, 1936 |
| 2,095,578 | Theiler | Oct. 12, 1937 |
| 2,179,991 | Bright et al. | Nov. 14, 1939 |
| 2,259,951 | Eversole et al. | Oct. 21, 1941 |
| 2,339,160 | Dunn et al. | Jan. 11, 1944 |
| 2,373,269 | Shiras et al. | Apr. 10, 1945 |
| 2,456,683 | Deansely | Dec. 21, 1948 |
| 2,464,244 | Levine et al. | Mar. 15, 1949 |
| 2,614,073 | Harcourt | Oct. 14, 1952 |